United States Patent [19]

Kooy et al.

[11] 4,051,213

[45] Sept. 27, 1977

[54] PROCESS FOR PRESSING BRIQUETTES FROM FINE-GRAINED FLUORSPAR AND PRESSED BRIQUETTES THUS OBTAINED

[75] Inventors: Albertus Adrianus Kooy, Schoorl; Jacobus van Rijkom, Ijmuiden, both of Netherlands

[73] Assignee: Hoogovens Ijmuiden BV, Ijmuiden, Netherlands

[21] Appl. No.: 561,691

[22] Filed: Mar. 25, 1975

[30] Foreign Application Priority Data

Apr. 5, 1974 Netherlands .......................... 7404651

[51] Int. Cl.$^2$ ............................................. C04B 35/00
[52] U.S. Cl. .................................. 264/109; 106/73.1; 264/63; 264/333
[58] Field of Search ............... 75/55, 53; 264/63, 333, 264/109, 56; 106/73.1

[56] References Cited

U.S. PATENT DOCUMENTS

| | | | |
|---|---|---|---|
| 2,184,078 | 12/1939 | Hyde | 106/73.1 |
| 3,871,869 | 3/1975 | Overdijk | 75/53 |

FOREIGN PATENT DOCUMENTS

| | | | |
|---|---|---|---|
| 1,323,554 | 5/1962 | France | 75/55 |
| 7,201,775 | 8/1973 | Netherlands | |

*Primary Examiner*—Robert F. White
*Assistant Examiner*—John Parrish
*Attorney, Agent, or Firm*—Stevens, Davis, Miller & Mosher

[57] ABSTRACT

A finely-grained fluorspar briquette and a process for producing a fine-grained fluorspar in briquette form in which the fine-grained fluorspar is intimately mixed with from 1 to 5%, by weight of blast furnace cement, the mixture is further mixed with from 1 to 6%, by weight of water glass and the ultimate mixture is compressed into briquette form.

3 Claims, No Drawings

PROCESS FOR PRESSING BRIQUETTES FROM FINE-GRAINED FLUORSPAR AND PRESSED BRIQUETTES THUS OBTAINED

The present invention relates to a process for pressing briquettes from fine-grained fluorspar. Flourspar is added to the slag in a steel converter in order to render the slag more fluid. This addition is in the form of pieces of fluorspar. During the last few years, coarsed-grained fluorspar has been scarce on the world market. The addition of fine-grained fluorspar to a steel converter is not feasible, inasmuch as the fine-grained fluorspar would be entrained by the gases, resulting in the disadvantages of a fluctuating yield as regards the measured quantity and an additional loading of the gas dedusting plant.

Proposals have been made in the past to briquet fluorspar, compare U.S. Pat. Nos. 3,044,140 and 3,871,869.

As during breaking and conveying fluorspar in the form of pieces large quantities of fine-grained fluorspar arise, this fine material is screened and from time to time pressed into briquettes by means of a binder. Therefore, it is necessary to store the briquettes until the time of use.

The cheapest way of storing is of course in the open air. It has been found however, that the fluorspar briquettes obtained when using the method according to U.S. Pat. No. 3,871,869, wherein as a binder 0.5 to 6% by weight of molasses and 0.5 to 5% by weight of cement are added, were less suited for storing in the open air because of softening by moisture.

The present invention aims to provide another binder for fine-grained fluorspar to be briquetted, wherein the briquettes are able to stand up against attack by moisture in the open air.

In accordance with the present invention fine-grained fluorspar is pressed in the form of briquettes, while using as a binder 1 to 6% by weight water glass and 1 to 5% by weight cement as a binder.

More specifically, 3 to 4% by weight of water glass and 1 to 4% by weight of cement is added to a quantity of fine-grained fluorspar having a maximum particle size of 6 mm, the resulting mixture is intimately mixed, and then pressed at room temperature in the form of briquettes in a briquet press.

It is known that both water glass and cement are binders if utilized in large quantities and not in combination. It is surprising, however, that a combined application thereof leads to a satisfactory initial strength of the briquettes thus manufactured without the necessity of an appreciable drying period, so that interstage storage has become superfluous, while the quantity required of each of the binders may be considered to be exceptionally small.

The order of mixing of the materials is very important, namely the fluorspar and the cement are mixed first followed by adding the water glass. A correct distribution of the fractions gives a stronger briquet, as much coarse material gives a too friable briquet and much fine material remains sticking in the rollers. The most favorable grain distribution for briquetting bulk material has been described in the literature.

Briquettes manufactured with water glass and cement can be stored in the open air. In particular briquettes with a binder comprising 4% by weight water glass and 2.5% by weight cement were stone-hard and had a perfect appearance.

EXAMPLE I 50 kg of fine-grained fluorspar having a grain size distribution of 70% between 0 and 2 mm, 20% between 2 and 4 mm and 10% between 4 and 6 mm, was mixed with 1 kg of blast furnace cement and 1.5 kg water glass. At room temperature the mixture thus obtained was pressed into briquettes in a conventional briquet press. The pressure between the rollers amount to approximately 500 kg/cm$_2$.

EXAMPLE II

50 Kg of fluorspar having a grain size distribution of 80% between 0 and 2 mm, 10% between 2 and 4 mm and 10% between 4 and 6 mm, was mixed with one kg of blast furnace cement. Thereafter 2 kg of water glass was added and the mixture thus obtained was pressed into briquettes in a briquet press. These briquettes were also very fast sufficiently strong to be transported and bunkered and showed little or no tendency for crushing. The cold compression strength amounted to 72 kg.

Some charges of steel were prepared in a steel converter with fluorspar briquettes obtained according to Example I and Example II as an addition. The performance of the thus dosed fluorspar met the expectations.

What is claimed is:

1. A process for pressing fine-grained fluorspar into briquettes, comprising mixing intimately fine-grained fluorspar having a maximum grain size of 6 mm with 1 to 5% by weight of blast furnace cement and then with 1 to 6% by weight of water glass at room temperature and subsequently pressing the mixture into briquettes in a briquet press.

2. The process according to claim 1, wherein 4% by weight of water glass and 2 to 3% by weight of blast furnace cement are utilized.

3. The process according to claim 1, wherein said mixture is pressed into briquettes with the aid of a briquet roller.

* * * * *